April 8, 1958
D. O. CARTER
2,829,556
APPARATUS FOR PRODUCING A STEREOSCOPIC
PHOTOGRAPH FROM SEISMIC DATA
Filed March 22, 1957
4 Sheets-Sheet 1
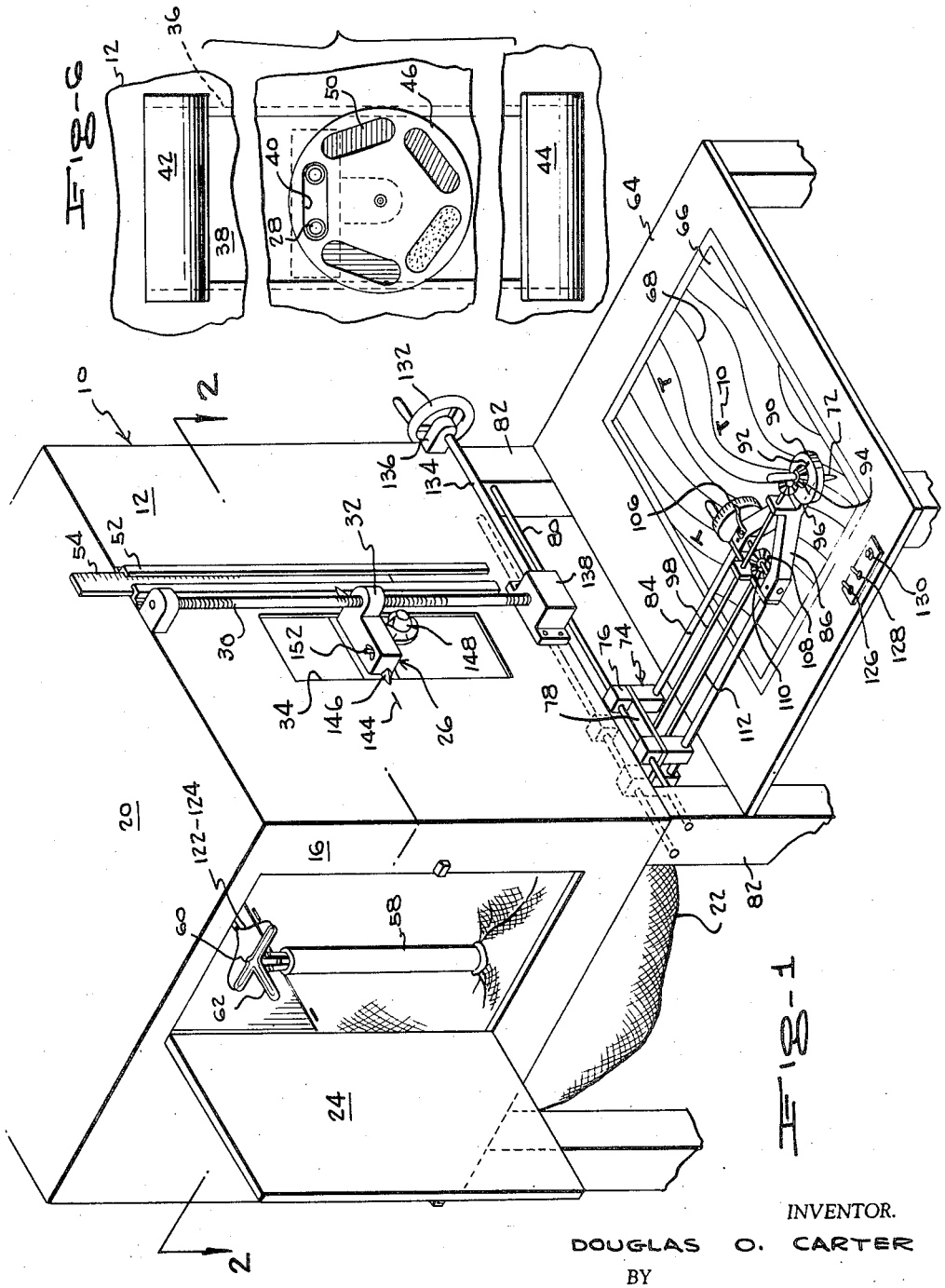
INVENTOR.
DOUGLAS O. CARTER
BY
McMorrow, Berman + Davidson
ATTORNEYS

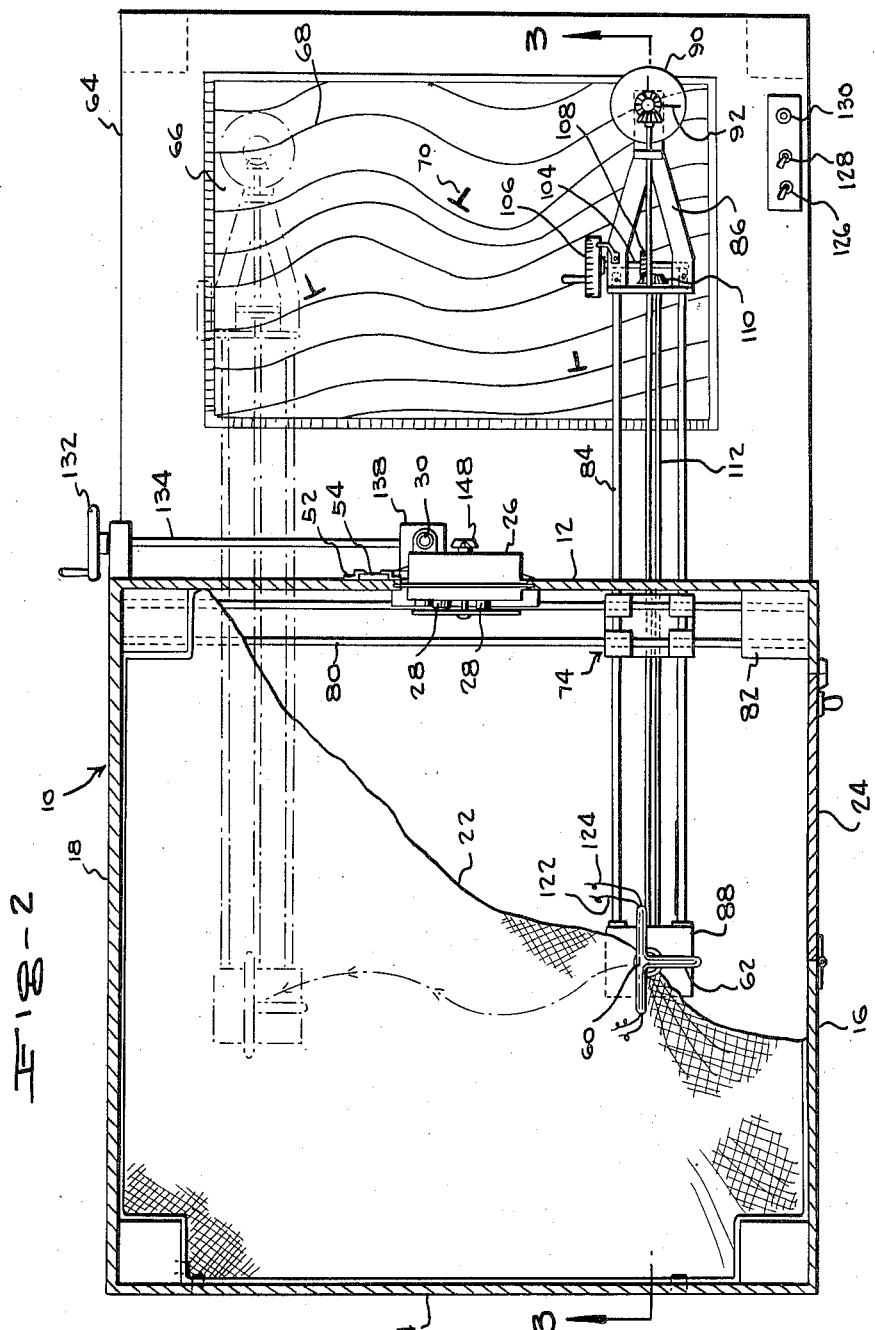

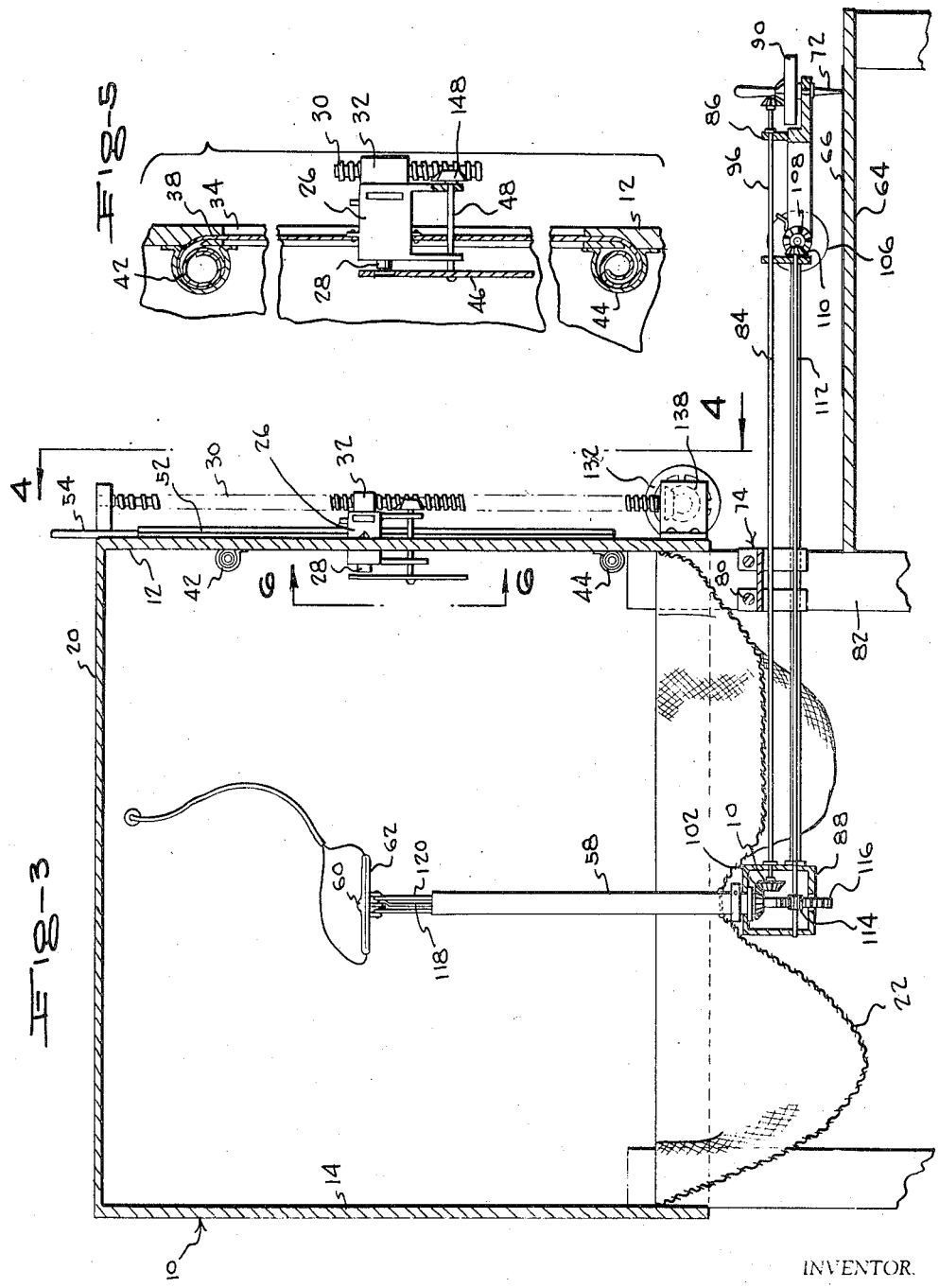

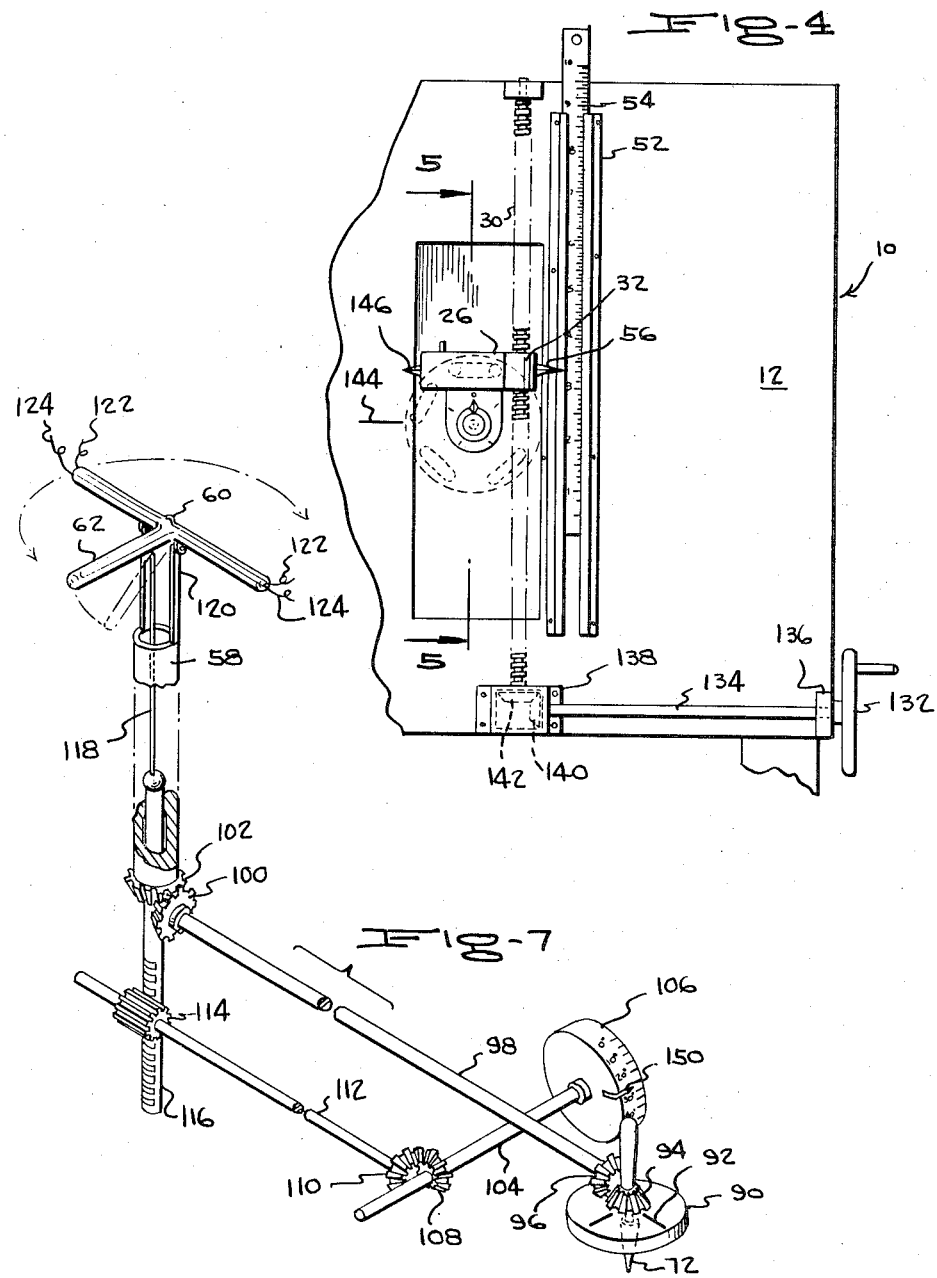

United States Patent Office 2,829,556
Patented Apr. 8, 1958

2,829,556

APPARATUS FOR PRODUCING A STEREOSCOPIC PHOTOGRAPH FROM SEISMIC DATA

Douglas O. Carter, Purcell, Okla.

Application March 22, 1957, Serial No. 647,856

4 Claims. (Cl. 88—24)

The present invention relates to an apparatus for making a stereoscopic photograph of data contained upon a seismic contoured chart.

An object of the present invention is to provide an apparatus which lends itself to the making of a photographic representation of seismic data in such form as to have three-dimensional characteristics when viewed through a stereoscopic viewer.

Another object of the present invention is to provide an apparatus for making a stereoscopic photograph from seismic contour data including earth strata inclination symbols, the representation having images thereon having the same tilt and angularity of such symbols.

A further object of the present invention is to provide an apparatus which may be used by geologists for visually depicting in three-dimensional photographs or negatives a cubic section of the earth, showing strata characteristics, fault lines, underground caverns, salt domes, oil pools and the like.

A still further object of the present invention is to provide an apparatus which may be used by engineers, architects, and others to reproduce in virtual three-dimensions any structural form drawn on a chart, map, or other sheet.

These and other objects and advantages of the present invention will be fully apparent from the following description when taken in connection with the annexed drawings, in which:

Figure 1 is an isometric view of the apparatus of the present invention with portions broken away;

Figure 2 is a sectional view, on an enlarged scale, taken on the line 2—2 of Figure 1;

Figure 3 is a sectional view, taken on the line 3—3 of Figure 2;

Figure 4 is a fragmentary elevational view taken on the line 4—4 of Figure 3;

Figure 5 is a sectional view taken on the line 5—5 of Figure 4;

Figure 6 is a fragmentary elevational view taken on the line 6—6 of Figure 3; and Figure 7 is an isometric view of the means for moving the light source, removed from the housing.

Referring in greater detail to the drawings, in which like numerals indicate like parts throughout the several views, the apparatus according to the present invention may be used for producing a stereoscopic photograph from seismic contour data contained on a chart and comprises an upstanding closed housing 10 having a front wall 12, a back wall 14 and side walls 16 and 18 connecting the adjacent ends of the front and back walls together. A top 20 extends over the upper ends of the front wall 12, the back wall 14 and the side walls 16 and 18.

A cloth bottom 22 extends between the lower ends of the front, back, and side walls and a door 24 normally closes an opening in the one side wall 16.

A stereoscopic camera, disposed horizontally, designated by the reference numeral 26, is positioned so that the lenses 28 (Figs. 2, 3, and 5) face into the interior of the housing 10. The camera 26 is mounted upon the front wall 12 of the housing 10 for upward and downward movement in a vertical plane, the means supporting the camera 26 including a vertically disposed screw 30 positioned exteriorly of and spaced from the housing 10 and threadedly engaged in a threaded boss 32 fixed to the rear of the camera 26. The front wall 12 of the housing 10 is provided with a rectangular upright opening 34 slotted at each side, as indicated by the dotted line 36 in Figure 6, providing a trackway for the vertical movement of a flexible closure member 38 having an elongated slot therethrough at 40 in Figure 6 through which project the lenses 28 of the camera 26. The ends of the closure member 38 are received in cylindrical elements 42 and 44 at the upper and lower ends, respectively, of the opening 34 in the front wall 12.

In Figures 5 and 6, a color filter wheel 46 is seen to be positioned upon a shaft 48 journaled below the housing of the camera 26 for rotation to positions in which various colored filter elements 50 (Fig. 6) may be positioned in registry with the slot 40 over the lenses 28.

A slideway 52 is disposed vertically on the outer face of the front wall 12 and slidably supports therein a scale 54 in cooperative relationship with respect to a pointer 56 carried by the camera 26.

A standard 58 is positioned within the field of view of the lenses 28 of the camera 26 within the housing 10 and has its lower end portion projecting below the cloth bottom 22 of the housing 10. A pin point light source, designated at 60 and to be described later, is positioned above and adjacent the upper end of the standard 58 and is carried by the standard 58.

A horizontally disposed illuminable tube 62, also described later, is arranged in cooperating relation with respect to the light source 60 and is also carried by the standard 58.

A support, such as a table 64, is positioned exteriorly of the housing 10 and a chart 66 containing seismic contour data including contour lines 68 and an earth strata inclination symbol (Figs. 1 and 2) designated by the reference numeral 70 associated with one or more of the lines 68, is mounted upon the support or table 64 in a viewing position.

A pointer 72 is positioned above the table 64 and is connected to the housing 10 for movement along the contour lines 68 on the chart 66.

Means is provided connecting the standard 58 to the pointer 72 for movement of the standard 58 in response to manually actuated movement of the pointer 72. Specifically, this means includes a carriage 74 consisting in four spaced upright blocks 76 and a horizontally disposed plate 78 connecting the blocks together. A pair of parallel rods 80 constitute a trackway for the carriage 74 beneath the housing 10 and have their ends supported in the legs 82 of the housing. Other rods 84, arranged in parallel spaced relation, extend through the lower portions of the blocks 76 for sliding movement therethrough and carry on one of their adjacent ends a V-shaped frame 86. A housing 88 is carried on the other end of the rods 84 and forms a means of support for the lower end portion of the standard 58.

A pointer 72 is journaled intermediate its ends in the forward portion of the frame 86 and carries a transparent dial 90 on which is inscribed a T symbol identical in form with the symbols 70 on the chart 66. The pointer 72 carries a beveled gear 94 in mesh with another beveled gear 96 on one end of a drive rod 98. A third beveled gear 100 on the other end of the rod 98 is in mesh with a fourth beveled gear 102 carried by the lower end of the standard 58. A horizontally disposed shaft 104 carries a hand wheel 106 on one end and is journaled in rotation to drive a beveled gear 108 which is in mesh with another beveled gear 110. The latter gear is on one end of a rod 112 which carries a spur gear 114 adjacent the other end, the spur gear being designated by the reference numeral 114. A vertically extending rack 116 is slidably mounted within the standard 58 for upward and downward movement and carries on its upper end a rigid wire element 118 having its upper end pivotally connected to the stem of the tube 62 which is of T-shape and simulates the T symbol 92 on the dial 90. The arms of the tube 62 are supported for tilting movement upon upright strips 120 rigidly fixed to the upper end of the standard 58.

The tube 62 and light source 60 preferably are fabricated of hollow glass tubing formed to a T shape with the light source consisting in a small incandescent lamp filament positioned in an enlarged part of the tubing adjacent the junction of the arms and the stem. When an electric current is applied to the wires 122, the filament in the light source will glow with sufficient intensity so as to register on the film in the camera 26. The symbol tube 92 also contains a filament extending through the stem and arms so that when an electric current is applied to the wires 124, the tube 92 will be also illuminated to a degree sufficient to register upon such a film.

The wires 122 and 124 are in circuit with switches 126, 128, and a pushbutton switch 130 mounted on the table 64 and with an external source of current.

The means connecting the camera 26 to the housing 10 for upward and downward movement in a vertical plane is shown in Figure 4 and consists in a handwheel 132 mounted on one end of the shaft 134 which is journaled adjacent that end in a trunnion 136 and has its other end projecting into a gear box 138 and carrying a bevel gear 140. Another bevel gear 142 is mounted upon the lower end of the screw 30 and is in mesh with the bevel gear 140. A reference line 144 is inscribed upon the outer surface of the front wall 12 and cooperates with a pointer 146 carried by the camera 26 for positioning the camera 26 with reference to the height of the light source 60 and tube 62 above the bottom of the housing 10.

A knob 148 is positioned exteriorly of the housing 10 and is mounted upon the adjacent end of the shaft 48 which carries the color wheel 46 on its other end. The knob 148 forms a means for manually shifting the wheel 46 so as to selectively position one of the color filters 50 over the lenses 28 of the camera 26.

Scale indicia is provided on the handwheel 106 cooperating with a pointer 150 mounted upon the frame 86 for indicating the angle of tilt of the tube 62 relative to the horizontal position. A shutter control 152 is positioned on the exterior of the camera 26 for opening and closing the shutter (not shown) within the camera 26.

The apparatus of the present invention is used as follows: The housing 10 is light-tight and preferably coated with a non-reflecting coating on its inner walls. Suitable film, either black and white, or in color, is inserted within the camera 26. A seismic contour data chart 66 is positioned on the table 64. The information on the seismic chart 66 is obtained by a conventional method such as seismic exploration of the earth strata at a certain level, for example, 10,000 feet. The light source 60 is not movable upwardly or downwardly so therefore the camera 26 is shifted upwardly to a position in which the pointer 56 registers with indicia on the scale 54 representing that depth. The appropriate one of the switches 128 or 130, connected to the light source wires 122, is now actuated to illuminate the light source 60 and the frame 86 is manually moved across the chart 66 with the pointer 72 following one of the contour lines 68. The frame 86 is movable toward and away from the near edge of the table and is also movable from the full line position in Figure 2 adjacent one side of the chart 66 to the dotted line position adjacent the other side of the chart 66. Each of the contour lines 68 is followed in turn by the pointer 72 with the shutter of the camera open so that the lines are reproduced on the film of the camera 26. Each of the earth strata inclination symbols 70 on the chart 66 is transferred to the film of the camera 26 by actuation of the other of the switches 126 so as to connect the wires 124 with the source of current. The pointer 72 is next positioned over the symbol 70 and the dial 90 rotated to the position in which the inscribed symbol 92 coincides with the position of the symbol 70 and is immediately above such symbol 70. The data upon the sheet 66 also contains information as to the angle of the dip of the strata with reference to the vertical. The handwheel 106 is turned so that the rack 116 moves upwardly or downwardly to position the stem of the tube 62 at the proper angle. The switch 126 is now operated to illuminate the filament within the tube 62 for the length of time necessary to imprint the film within the camera 26. The switches 128 and 130 each are used to illuminate the light source 60, the switch 128 when it is desired to imprint a continuous line on the film and the switch 130 when a dotted line is desired. The hand wheel 132 is turned to raise or lower the camera 26 above and below the reference depth line to record variations in depth of the contour lines.

When all the data on the chart 66 has been transferred to the film, another chart is placed on the table 64 and the camera moved to the appropriate level with reference to the level at which the information on the chart was obtained. Successive charts are used in turn and the data thereon transferred to the film within the camera 26 with the wheel 46 turned as desired to print some of the contour lines and other data in selected colors if color film is within the camera 26.

The film may be processed to a photograph in positive or left as a negative, as desired, and when viewed through a stereoscopic device (not shown) of conventional construction, the lines upon the film will have three dimensions and appear to be a cube representing the particular strata of the earth and, when so viewed, assists the user to determine the location within such strata of faults, salt domes, oil pools and the like, if such are present within the explored section of the earth.

Although the apparatus according to the present invention has been described in conjunction with the representation on film in three dimensions of earth strata contour data, it is not intended that the apparatus be confined to such use. Architects, shipbuilders, and others will find the apparatus useful in producing a photograph having virtual three dimensions of any structure which can be depicted upon a map, chart, or other sheet.

What is claimed is:

1. In an apparatus for producing a stereoscopic photograph from seismic data, an upstanding closed housing, a stereoscopic camera positioned so that the lenses thereof face into the interior of said housing, a pin point light source positioned within the field of view of said camera, a support exteriorly of said housing, a chart containing seismic contour data mounted on said support in a viewing position, a pointer positioned above said support and connected to said housing for movement along the contour data on said chart, and means connecting said light source to said pointer for movement with the latter.

2. In an apparatus for producing a stereoscopic photograph from seismic data, an upstanding closed housing, a stereoscopic camera positioned so that the lenses thereof face into the interior of said housing, means connecting said camera to said housing for up and down movement in a vertical plane, a pin point light source positioned within the field of view of said camera, a support exteriorly of said housing, a chart containing seismic contour data mounted on said support in a viewing position, a pointer positioned above said support and connected to said housing for movement along the contour data on said chart, and means connecting said light source to said pointer for movement with the latter.

3. In an apparatus for producing a stereoscopic photograph from seismic data, an upstanding closed housing, a stereoscopic camera positioned so that the lenses thereof face into the interior of said housing, a support exteriorly of said housing, a chart containing seismic contour data including contour lines and an earth strata inclination symbol associated with one or more of said lines mounted on said support in a viewing position, a standard positioned within the field of view of the lenses of said camera, a pin point light source arranged above and adjacent the upper end of said standard and carried by said standard, a horizontally disposed illuminable tube conformably shaped to said inclination symbol arranged in cooperating relation with respect to said light source and carried by said standard, a pointer positioned above said support and connected to said housing for movement along the contour data lines on said chart, means connecting said standard to said pointer for movement with the latter, and means operatively connected to said tube for shifting the latter from the horizontal position to positions at an angle to the horizontal corresponding to said chart earth strata inclination symbol.

4. In an apparatus for producing a stereoscopic photograph from seismic data, an upstanding closed housing, a stereoscopic camera positioned so that the lenses thereof face into the interior of said housing, means connecting said camera to said housing for up and down movement in a vertical plane, a support exteriorly of said housing, a chart containing seismic contour data including contour lines and an earth strata inclination symbol associated with one or more of said lines mounted on said support in a viewing position, a standard positioned within the field of view of the lenses of said camera, a pin point light source arranged above and adjacent the upper end of said standard and carried by said standard, a horizontally disposed illuminable tube conformably shaped to said inclination symbol arranged in cooperating relation with respect to said light source and carried by said standard, a pointer positioned above said support and connected to said housing for movement along the contour data lines on said chart, means connecting said standard to said pointer for movement with the latter, and means operatively connected to said tube for shifting the latter from the horizontal position to positions at an angle to the horizontal corresponding to said chart earth strata inclination symbol.

No references cited.